United States Patent [19]

Nighan, Jr. et al.

[11] Patent Number: 5,412,683
[45] Date of Patent: May 2, 1995

[54] CONFOCAL DIODE PUMPED LASER

[75] Inventors: William L. Nighan, Jr., Menlo Park; Mark S. Keirstead, San Jose, both of Calif.

[73] Assignee: Spectra-Physics Lasers, Inc, Mountain View, Calif.

[21] Appl. No.: 191,772

[22] Filed: Feb. 4, 1994

[51] Int. Cl.⁶ .................. H01S 3/08; H01S 3/0933; H01S 3/105
[52] U.S. Cl. ...................... 372/75; 372/92; 372/101; 372/93
[58] Field of Search .............. 372/69, 71, 72, 97, 372/75, 92, 101, 93

[56] References Cited

U.S. PATENT DOCUMENTS

| | | | |
|---|---|---|---|
| Re. 34,729 | 10/1994 | Sipes, Jr. et al. | 372/75 |
| 4,951,294 | 8/1990 | Basu et al. | 372/71 |
| 5,014,279 | 5/1991 | Esterowitz et al. | 372/71 |
| 5,117,436 | 5/1992 | Hanson | 372/75 |
| 5,127,068 | 6/1992 | Baer et al. | 385/34 |
| 5,130,995 | 7/1992 | Grossman et al. | 372/13 |
| 5,182,759 | 1/1993 | Anthon et al. | 372/97 |
| 5,285,467 | 2/1994 | Scheps | 372/69 |
| 5,303,250 | 4/1994 | Masuda et al. | 372/69 |
| 5,307,358 | 4/1994 | Scheps | 372/71 |

OTHER PUBLICATIONS

Siegman, Anthony E., "Lasers", University Science Books, Mill Valley, Calif., pp. 750–759, 1986.
Koechner, Walter, "Solid–State Laser Engineering", Springer–Verlag, 3rd Revised edition, pp. 204–205. (1976, 1988, 1992).

Primary Examiner—Rodney B. Bovernick
Assistant Examiner—Robert McNutt
Attorney, Agent, or Firm—Haynes & Davis

[57] ABSTRACT

A high efficiency, diode pumped laser includes a resonator mirror and an output coupler which define a nearly confocal resonator. Positioned in the resonator is a laser crystal. A diode pump source supplies a pump beam to the laser crystal and produces an output beam. A strong thermal lens transforms a non-confocal resonator to a nearly confocal resonator. The TEM00 mode diameter in the laser crystal may be smaller than the pump beam diameter that is incident on the laser crystal. Output powers greater than about 4 W are achieved, the overall optical efficiency is greater than about 25%, and an optical slope efficiency in a TEM00 mode of greater than 40% is possible.

35 Claims, 8 Drawing Sheets

CONFOCAL DIODE PUMPED LASER

CROSS-REFERENCE TO RELATED APPLICATIONS;

THERMAL LENS OF CONTROLLED ELLIPTICITY, U.S. patent application Ser. No. 08/191,654, filed on the same date as the instant application, inventors Mark K. Kierstead, William L. Nighan, Jr. and Thomas M. Baer, assigned to the assignee of the instant application, incorporated herein by reference.

DIODE PUMPED LASER WITH STRONG THERMAL LENS CRYSTAL,

U.S. patent application Ser. No. 08/191,655, filed on the same date as the instant application, inventors William L. Nighan, Jr. and Mark K. Kierstead, assigned to the assignee of the instant application, incorporated herein by reference.

1. Field of the Invention

This invention relates generally to highly efficient, high power, TEM00 lasers that have low sensitivity to misalignment with high beam pointing stability, and more particularly to diode pumped lasers that are nearly confocal.

2. Background of the Invention

There are many laser applications where insensitivity to misalignment and beam pointing stability are critical. These characteristics are desirable in order that the laser power and mode do not degrade upon vibration, shock or thermal cycling.

Confocal or nearly confocal resonators are suitable candidates when misalignment sensitivity and beam pointing stability are important considerations. With confocal resonators, the mode diameter throughout the resonator does not vary by more than about the square root of two. Another description is that the laser resonator is about 2 times as long as the Rayleigh range of the intracavity mode.

A greater understanding of confocal or nearly confocal resonators can be ascertained with reference to FIG. 1(a), a stability diagram with two axes, g1 and g2. The values of the stability parameters g1 and g2 are defined as:

$$g1 = 1 - L/R1$$

$$g2 = 1 - L/R2$$

where L is the length of the resonator and R1, R2 are the respective radii of curvature of mirrors M1 and M2 of the resonator, shown in FIG. 1(b). A two mirror laser resonator is stable if $0 < (g1)(g2) < 1$. The TEM00 mode size of a resonator can be represented in terms of g1 and g2, and the stability parameters can also be used to judge misalignment sensitivity and other practical resonator characteristics. This background discussion should be familiar to those skilled in the art, and can be found in W. Koechner, "Solid State Laser Engineering", 3rd edition, Springer-Verlag, NY, p. 204–205 (1992).

It should be noted that this stability analysis can be extended to a resonator with an intracavity lens or lenses as well as shown in FIG. 1(c). The intracavity lens could be a conventional lens or a thermal lens. A thermal lens can be generated in a laser crystal by diode pump light, or by lamp pump light. In this case, the g parameters become:

$$g1 = 1 - L_2/f - L_o/R1$$

$$g2 = 1 - L_1/f - L_o/R2$$

where $L_o = L_1 + L_2 - (L_1, L_2/f)$, and $L = L_1 + L_2$ are as shown in FIG. 1(c), R1 and R2 are defined as in the case of no lens, and with f being the focal length of the intracavity lens which could be a thermal lens. This background is also presented in W. Koechner, "Solid State Lasers Engineering", 3rd edition, Springer-Verlag, NY p. 204–205 (1992).

It should therefore be noted that the traditional two mirror stability analysis, with stability parameters g1 and g2, is still useful when more complicated, multiple mirror and lens resonators are being considered.

With reference now to FIG. 1(a), in the upper right quadrant, a hyperbola 10 defines a region 12, bounded between hyperbola 10 and the g axes. For a resonator with valves of g1 and g2 within region 12, a gaussian mode can exist. Hyperbola 10 has the characteristic that $g1 \times g2 = 1$. Region 12 represents a stable regime; a gaussian mode can exist between the two mirrors defining the resonator. In the lower quadrant 14, another stable regime is found; gaussian modes can also exist for these g values. The ideal confocal resonator corresponds to point 16, the intersection of the g1 and g2 axis, where $g1 = g2 = 0$. Point 16 represents the ideal confocal resonator. A resonator can be called nearly confocal if g1 and g2 are not too large.

In FIG. 2, an ideal confocal resonator 18 is defined by two opposing mirrors, 20 and 22, each having a radius of curvature R1 and R2, respectively. Mirrors 20 and 22 are separated by a distance L. For an ideal confocal resonator 18, $R1 = R2 = L$. If a lens is used at the center of the cavity and flat mirrors are used, a confocal resonator arises when $f = L/2$. A combination of lenses and curved mirrors can also produce a confocal resonator.

Referring again to FIG. 1(a), a plane parallel resonator corresponds to points indicated at 24, where $g1 = g2 = 1$. The values of g1 and g2 place this resonator right on the edge of the stability diagram, and for applications requiring insensitivity to misalignment and pointing stability, the plane parallel resonator is typically not the best choice.

A large radius resonator exists when R1 and R2 are much larger than L, and corresponds to points 26 in FIG. 1(a). Large radius resonators are useful for diode pumping. In one embodiment of a large radius resonator, a Nd:YLF crystal is used and the mode size of the TEM00 is large, which facilitates conventional mode-matching. This resonator is, however, sensitive to misalignment and pointing. As an example, a large radius resonator of length L with R-10L, is five times more sensitive to misalignment than the confocal resonator of length L. This is also shown by W. Koechner in the reference.

A concentric or spherical resonator, where $R1 = R2 = L/2$, is represented at 24. In this case, $g1 = g2 = 1$. It has the properties that the mode can be very large at one point of the resonator, and very small at the other. This is mainly because the mirrors are on the surface of a sphere. The TEM00 modes of such a resonator are very small at the center of the resonator, but very large at the ends. An equivalent resonator can be constructed using a lens or lenses and flat mirrors, or with a combination of lenses and curved mirrors.

A half symmetric resonator 30 is illustrated in FIG. 3. It is defined by a curved mirror 32 and a flat mirror 34, separated by a distance L. In this instance, R1 is the radius of curvature of mirror 32. Because mirror 34 is flat, it has an infinite radius of curvature. A half symmetric resonator can be made to have equivalent properties with that of a confocal resonator, if $g2=1$ and $g1 \sim \frac{1}{2}$. In FIG. 1(a), the half symmetric confocal resonator corresponds to point 36 on the stability diagram. A half symmetric resonator can also be a large radius resonator, where one mirror is flat, and the other has a curvature $R_1 \gg L$. Again, an equivalent resonator can be constructed using a lens or lenses and flat mirrors, or with a combination of lenses and curved mirrors.

Because a confocal resonator is relatively insensitive to misalignment, a mirror can be tilted a certain amount and the power does not drop as rapidly as with other types of lasers. The mode in the confocal resonator does not change or move very much as mirrors are tilted. Because the confocal's pointing stability and its misalignment sensitivity are very good, for example as a function of environmental changes, this type of resonator has some useful properties.

A major disadvantage of a confocal resonator is that it has the smallest average TEM00 mode diameter of any resonator of any length L. In essence, the TEM00 mode volume of the confocal resonator of length L is smaller than that of other resonators of length L. This makes conventional mode matching difficult.

This is taught in A.E. Siegman, "Lasers", University Science Book, Mill Valley, CA, p. 750-759, 1986. Because of its small average size, the TEM00 mode in a confocal resonator is not very effective in extracting power from a large diameter gain medium. Additionally, because of the small average size of the TEM00 mode, a confocal resonator is very likely to oscillate in a combination of the lowest and higher order modes. An important design goal for many diode pumped solid state laser is the generation of nearly diffraction limited TEM00 output at the highest possible efficiency and power. Because of the small TEM00 mode size of a confocal resonator, and its tendency to oscillate in a combination of the lowest and higher order modes, diode end pumping a confocal resonator has not been considered useful.

The effect of mode-matching is to maximize the coupling between the TEM00 mode and the excited volume in the crystal. In turn, the optical slope and the overall optical efficiencies of the laser are both maximized. In a classic mode-matched geometry, the ratio of the TEM00 mode diameter to the diameter of the pump beam in an Nd:YAG pumped laser is about 1.3 or greater. Because of the small TEM00 size, this ratio is more difficult to achieve with a confocal resonator.

The thermal lens in a laser crystal can be used in combination with mirror curvatures or conventional lenses to design a nearly confocal resonator. Certain crystals exhibit strong thermal lens characteristics, these laser crystals have other important properties that make them suitable candidates for laser resonators. For example, in comparison to Nd:YLF, the strong thermal lens material Nd:YVO4 has a high gain and a short upper state lifetime. These properties provide important adjustable parameters when designing a Q-switched laser with high pulse energy or high repetition rate, or a laser that is insensitive to optical feedback. Additionally, Nd:YVO4 has a high absorption coefficient at the diode pump wavelength of ~809 nm, permitting efficient coupling of diode pump light into the Nd:YVO4 crystal.

Many laser crystals have strong thermal lenses. With a strong thermal lens, the focussing power of the pump induced lens is at least comparable to that of the other optics in the laser resonator. A strong thermal lens significantly changes the size and divergence of a laser resonator eigenmode within the resonator.

With a weak thermal lens, the focussing power of the pump induced lens is substantially lower than that of the other optics in the laser resonator such as mirrors and typical lenses. The other optics in the laser resonator dictate the size and divergence of the resonator eigenmode.

It is clear that a thermal lens can be used to build a nearly confocal resonator. However, it has been thought that the large aberrations of strong thermal lens materials limit the efficiency of high power resonators. It has been generally believed that strong thermal lensing is a hindrance in the design and construction of an efficient laser with high TEM00 beam quality, high power and high efficiency. Therefore, successful use of strong thermal lens materials at higher pump powers has been limited.

Additionally, classical mode-matching has taught that TEM00 mode diameter to pump beam diameter ratios less than unity are of little interest since laser threshold is high and the achievable conversion efficiency is poor. Ratios of less than unity result in lower gain while those approaching and exceeding unity can result in higher loss due to aberration. It is more difficult to achieve a ratio greater than unity with a nearly confocal resonator since the TEM00 mode size is small. This feature goes against the teaching of conventional mode matching.

The use of diodes as pump sources for confocal resonators is desirable for reasons of cost, size and wall plug efficiency. Some strong thermal lens materials have certain properties that would make them useful for diode pumped lasers.

It is desirable to have a compact, efficient low cost diode pumped laser that is insensitive to misalignment and has high pointing stability. It would also be desirable to provide a nearly confocal resonator that has these properties, that is diode pumped, is high powered, and highly efficient, and uses strong thermal lens materials and has a TEM00 mode diameter in the laser crystal that is less than the diameter of the pump beam.

SUMMARY OF THE INVENTION

It is an object of the invention to provide a nearly confocal resonator that is diode pumped.

Another object of the invention is to provide a high efficiency, high power, diode pumped, nearly confocal resonator.

Still another object of the invention is to provide a diffraction limited, high efficiency, diode pumped, nearly confocal resonator.

Another object of the invention is to provide a nearly confocal resonator that uses strong thermal lens laser crystals.

Yet another object of the invention is to provide a multi-port nearly confocal resonator that is diode pumped.

A further object of the invention is to provide a multi-port, diode pumped nearly confocal resonator that is highly efficient and has high output power.

These and other objects of the invention are achieved by a highly efficient, diode pumped laser that includes a resonator mirror or mirrors and an output coupler, and one or more crystals that also act as thermal lenses, all of which define a nearly confocal resonator. A laser crystal or crystals are positioned in the resonator along a resonator optical axis. A diode pump source supplies a pump beam to the laser crystal and produces an output beam. A power source supplies power to the diode pump source.

A nearly diffraction limited output is produced. This is achieved with a pump source diameter of about the same size as the TEMOO mode diameter in the laser crystal, or with a pump source diameter that can be larger than the TEMOO mode diameter. A strong thermal lens laser crystal or crystals can be used, and the desirable confocal properties, insensitivity to misalignment and improved beam pointing stability, are achieved in a resonator that is confocal or nearly confocal. The thermal lensing effects of the strong thermal lens laser crystal can be used in a resonator with flat or curved mirrors to create a nearly confocal resonator. Its focussing power modifies the resonator's stability and places the laser at a different point in the stability diagram than the "cold", unpumped resonator. Highly efficient diode-pumped operation of a confocal or nearly confocal resonator in a TEMOO mode has not predicted by prior investigators.

More than one laser crystal can be used in order to increase the output power of the resonator. In addition to a simple linear design, "W", "V", "Z" and multiple "Z" folded geometries can be used in order to increase the number of laser crystals. A laser crystal can be pumped by more than one diode source in order to increase the output power of the resonator. Pumping more than one crystal, or more than one surface of one crystal, is useful in order to scale the power without breaking or fracturing the laser crystals, and allows power scaling.

A high power, high efficiency diode pumped laser with diffraction limited beam quality is provided. It is insensitive to misalignment and exhibits high beam pointing stability.

DETAILED DESCRIPTION OF THE DRAWINGS

FIG. 1(a) is a stability diagram for a two mirror resonator. The diagram shows the stability parameter for different types of resonators, including those with lenses. An ideal confocal resonator is where g1 and g2 equal 0.

Figure 3:
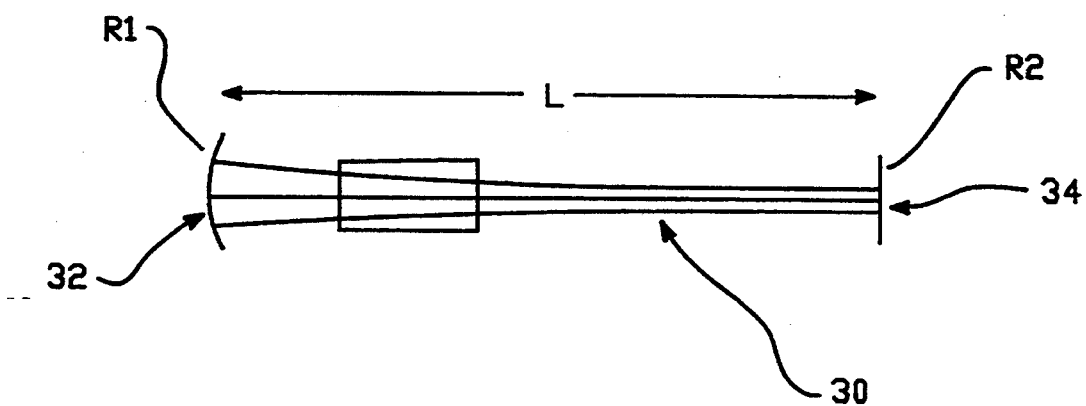

FIG. 3 is a schematic diagram of a half symmetric confocal resonator with two mirrors. One of the mirrors is flat. The curved mirror has a radius of curvature, R1 equal to 2L, where L is the distance between the two mirrors. The flat mirror has a radius of curvature equal to infinity.

Figure 4:
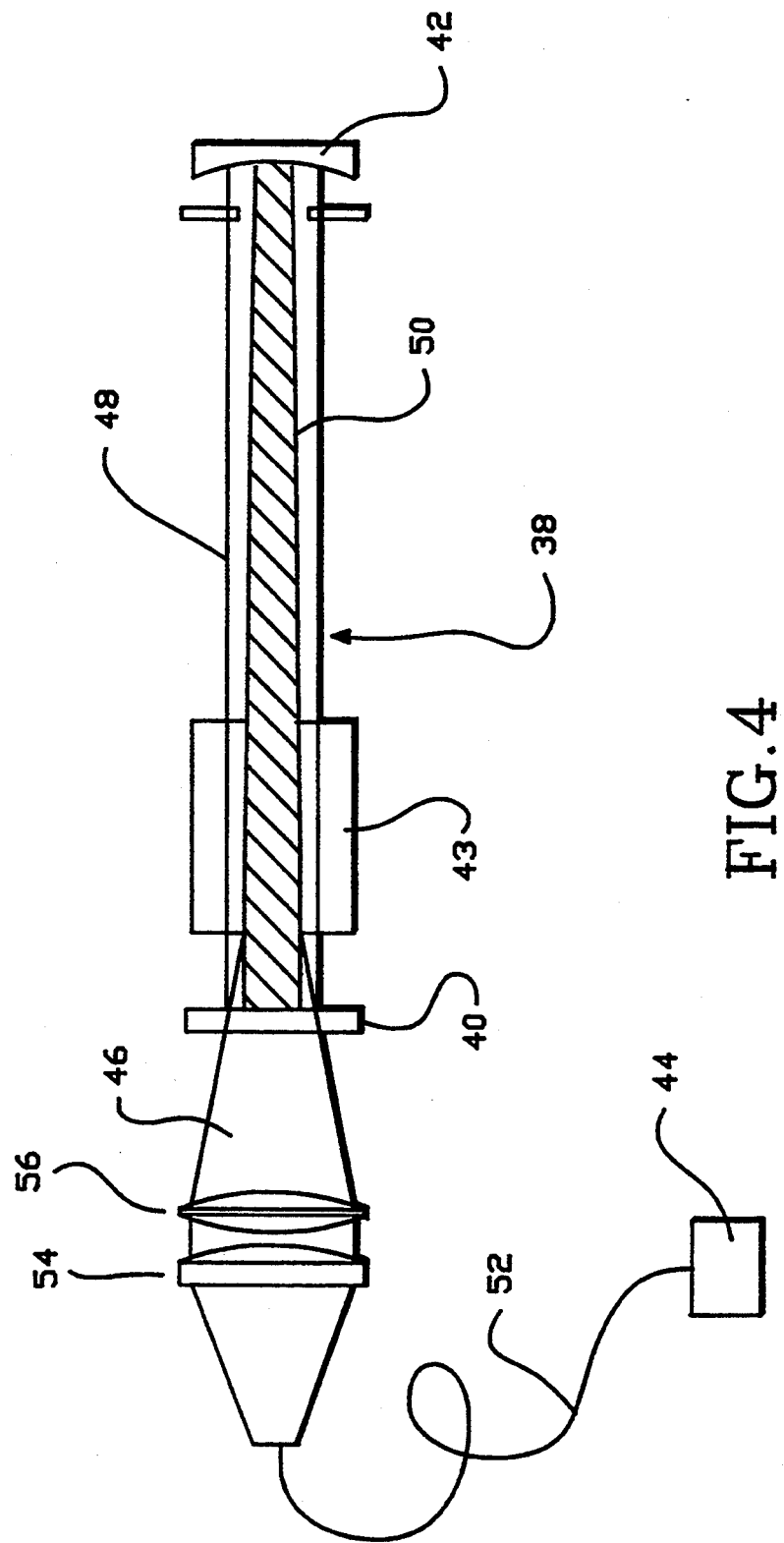

FIG. 4 is a schematic diagram of a long radius mirror resonator using an Nd:YLF laser crystal, and for comparison shows the mode size of a laser using an Nd:YVO4 crystal.

Figure 5:
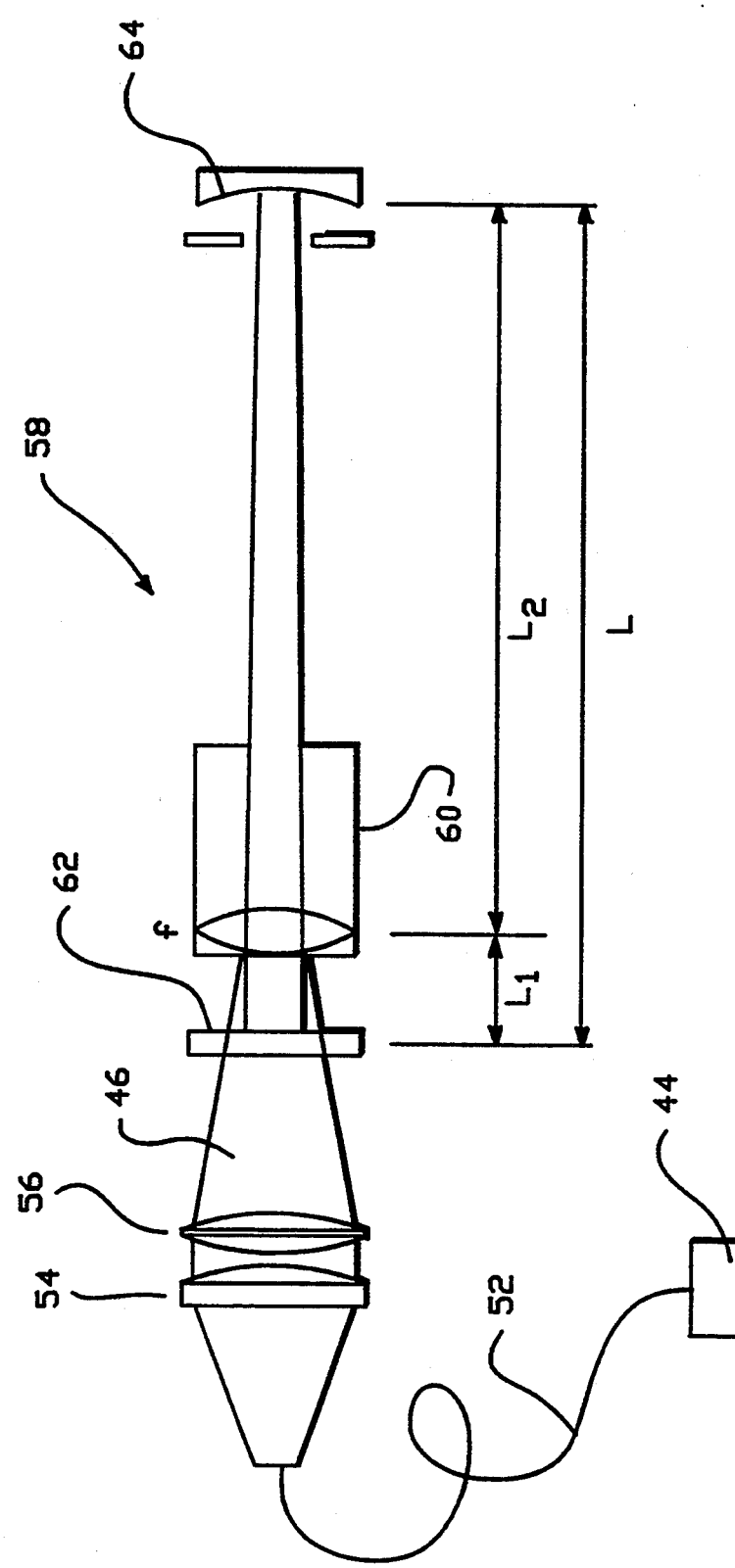

FIG. 5 is a schematic diagram of an asymmetric resonator.

Figure 6:
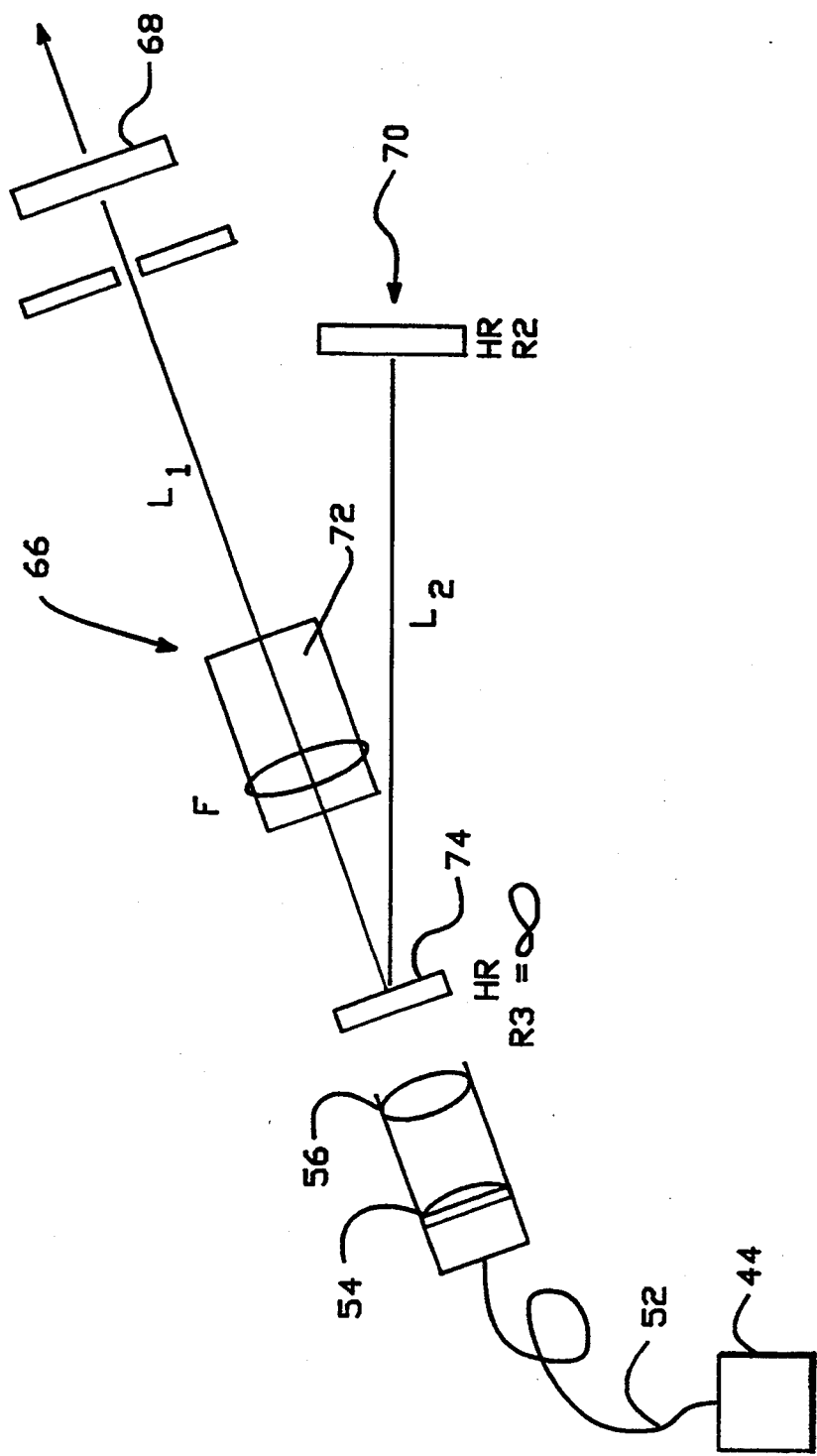

FIG. 6 is a schematic diagram of a symmetric resonator that is folded and has a single port.

Figure 7:
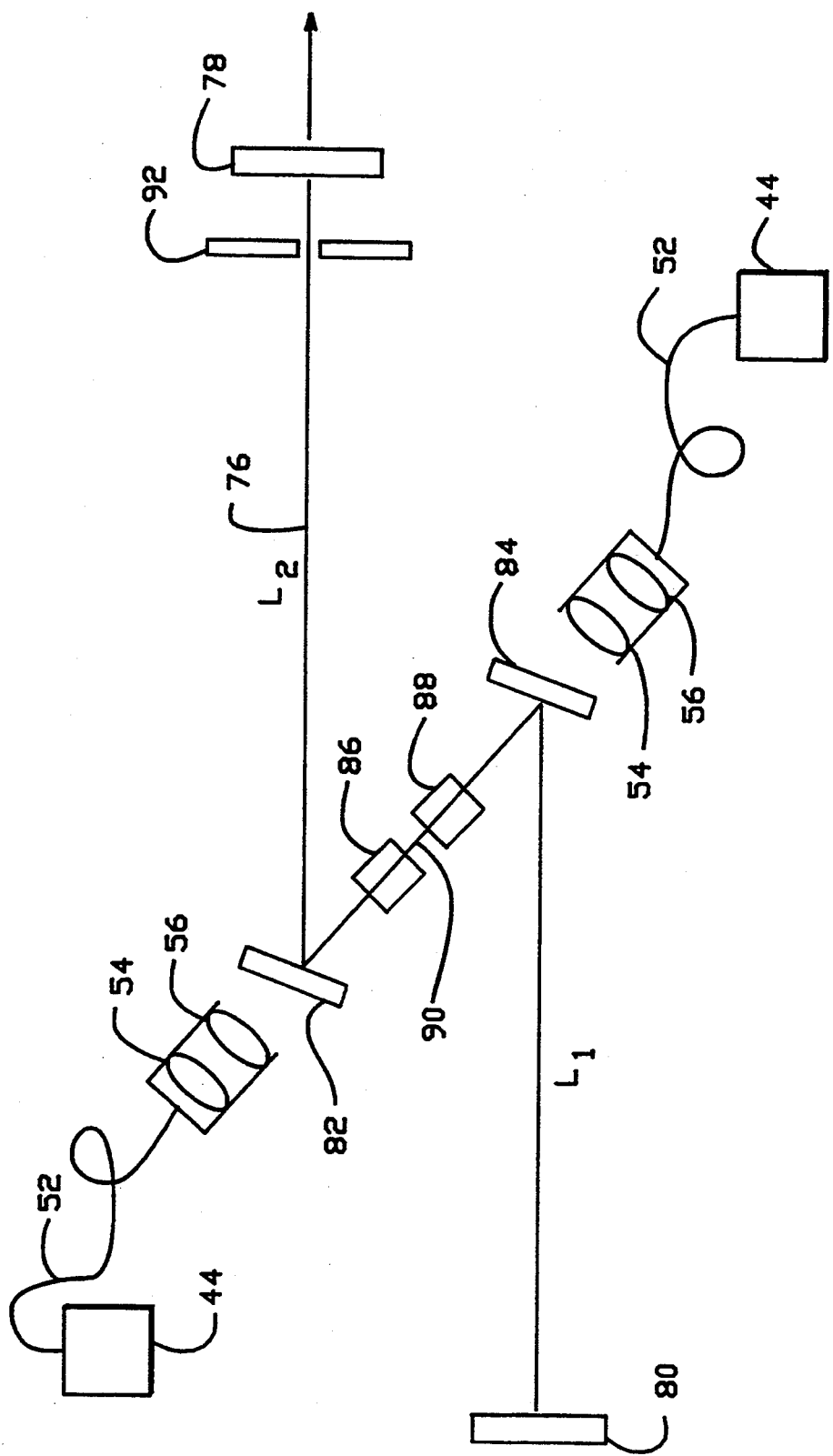

FIG. 7 is a schematic diagram of a two port resonator.

Figure 8:
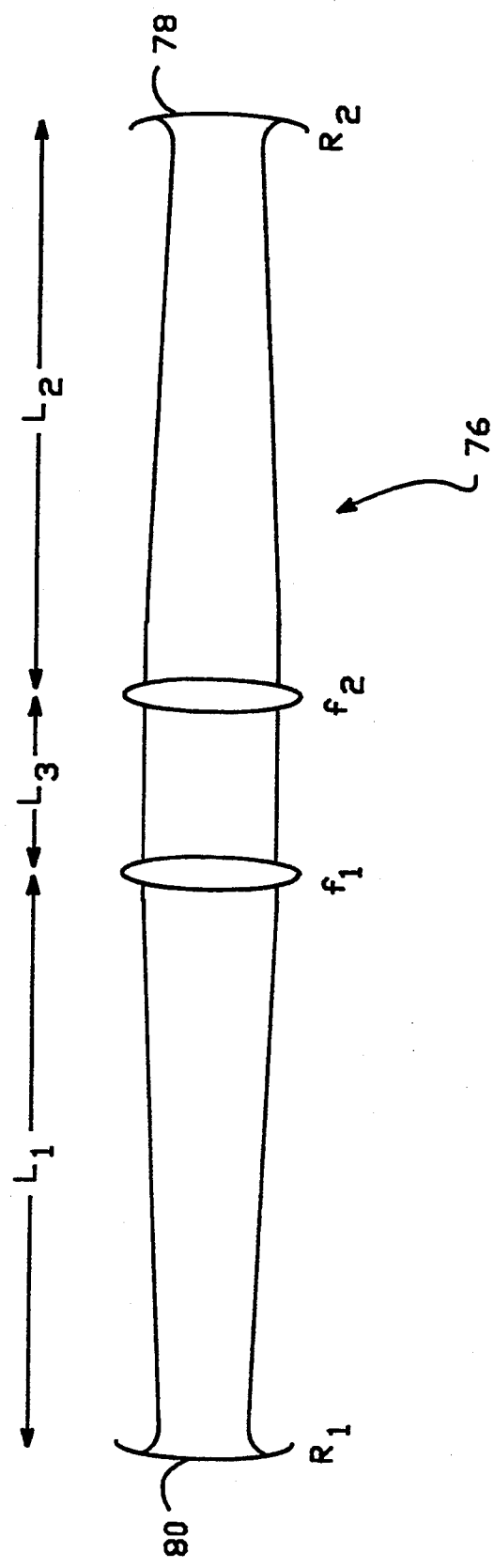

FIG. 8 is a schematic diagram of the resonator of FIG. 7, pulled apart to eliminate the folds, in order to show the relationship between L1, L2 and L3.

Figure 9:
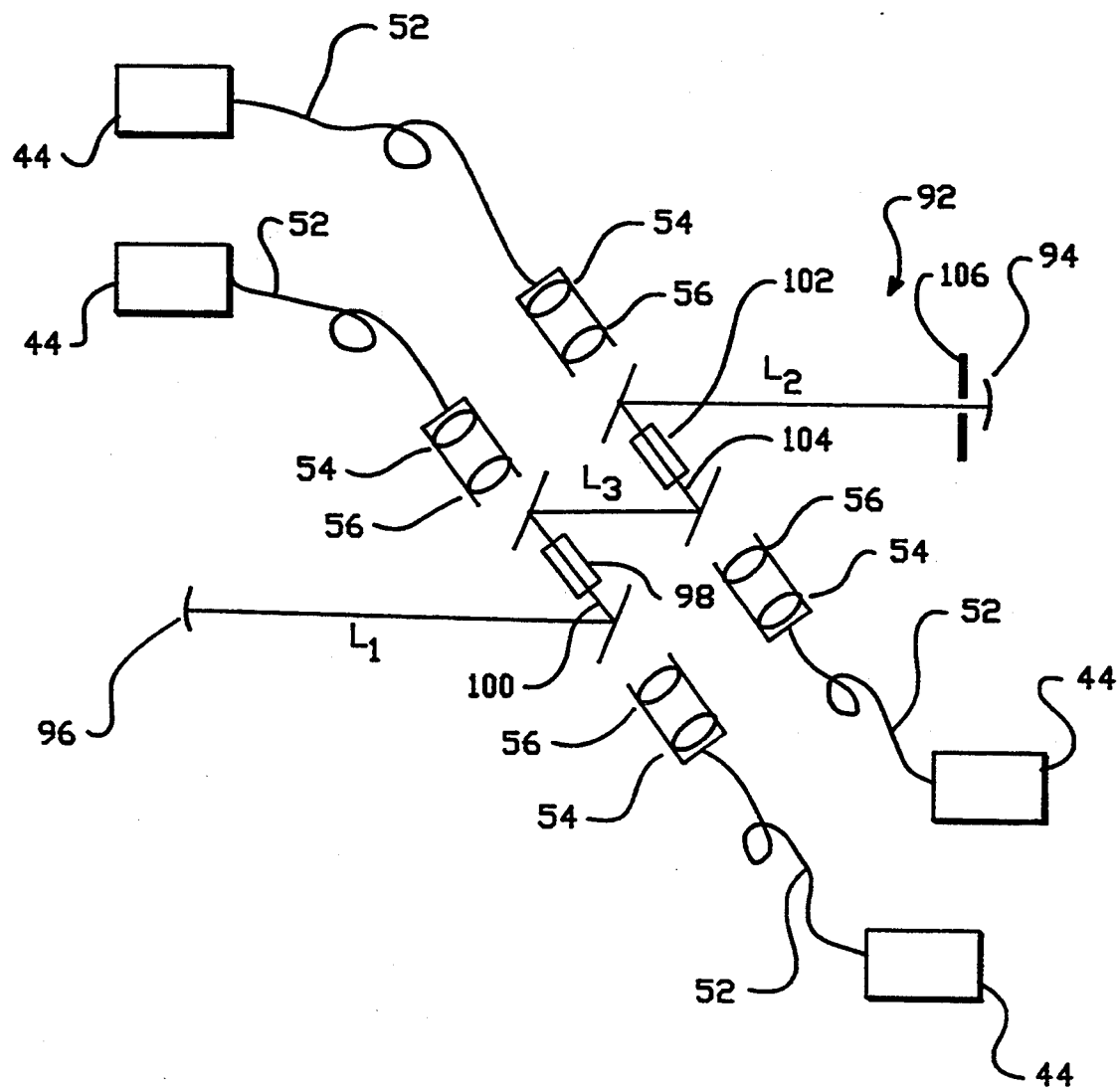

FIG. 9 is a schematic diagram of a double "Z" folded resonator.

DETAILED DESCRIPTION OF THE PREFERRED EMBODIMENTS

The high efficiency, high power diode pumped laser, of the present invention, has a resonator mirror or mirrors and an output coupler defining a nearly confocal resonator. A laser crystal is positioned in the resonator along a resonator optical axis. A diode pump source supplies a pump beam to the laser crystal and produces an output beam. A power source supplies power to the diode pump source. Aperture stops can be included for improved TEMOO operation.

For purposes of the present invention, a nearly confocal resonator means exactly confocal and also includes:

a symmetric resonator where g1=g2, and g1, g2<0.5, or the cavity length L is about twice the Rayleigh range of a waist of the resonator eigenmode, where the Rayleigh range is, where wo=waist radius size and λ=wavelength.

A perfect symmetric confocal resonator is g1=g2=0, or L=2R exactly. If the resonator is half-symmetric, then g1 or g2 ~ 1 and the other g parameter is near 0.5, or the cavity length L is about one Rayleigh range of a waist of the resonator eigenmode.

Additionally, nearly confocal also includes those asymmetric resonators of length L that share properties with nearly confocal symmetric and half-symmetric resonators. The g parameters may differ from the above definitions, but the length of the resonator is on the order of 1 to 2 Rayleigh ranges as defined above.

For purposes of the present invention, the following definitions apply:

Strong thermal lens: The focussing power of the pump induced lens is at least comparable to that of the other optics in the laser resonator. A strong thermal lens significantly changes the size and divergence of a laser resonator eigenmode within the resonator.

Weak thermal lens: The focussing power of the pump induced lens is substantially lower than that of the other optics in the laser resonator such as mirrors and typical lenses. The other optics in the laser resonator dictate the size and divergence of the resonator eigenmode.

The laser of the present invention has an optical efficiency is greater than 25%. In a preferred embodiment, its optical efficiency is greater than 40%. High power, polarized TEMOO operation of the laser is an output beam greater than 4 W in a TEMOO mode. Its output is substantially TEMOO, or nearly diffraction limited, if at least 95% of the power of output beam is measured to an M2 value less than 1.2, where M2 is defined as the ratio of theoretical confocal parameter of a beam, as predicted by an extracavity waist size, to the actual measured confocal parameter. In a preferred embodiment, $M^2$ is <1.05. The output beam profile has a least squares deviation from an ideal gaussian profile of less than 10%. In a preferred embodiment, this deviation is less than 1%. Additionally, in certain embodiments, the laser may use a laser crystal where the diode pump induced thermal lens in the crystal provides an optical path difference as a function of radius that is not described by a parabolic profile.

In FIG. 4, a long radius mirror resonator 38 includes a high reflector 40, output coupler 42, laser crystal 44 and a diode pump source 43. If laser crystal 44 is Nd:YLF, and with a pump beam 46 with a diameter of about 0.7 mm incident upon crystal 44, the TEM00 mode diameter 48 is about 1 mm, and it remains fairly constant in resonator 38. With a strong thermal lens material with strong thermal aberrations, such as Nd:YVO4, the same pump diameter can produce a TEM00 mode diameter 50 of about 0.56 mm, which is smaller than the pump diameter. The laser is highly efficient in spite of this deviation from conventional mode matching.

Diode pump source 43 can be a single diode, spatial emitter, diode bar or a plurality of diodes or diode bars. A suitable diode source 43 is model No. OPC-A020-810-CS, available from OptoPower Corporation, City of Industry, Calif. Preferred wavelengths of diode source 43 are in the range of 795 to 815 nm. Wavelengths of specific crystals are as follows: Tm:YAG-785 nm; Nd:YLF-797; and Nd:YAG, Nd:YVO4-809 nm.

Diode source 43 is coupled to one or more optical fibers 52. Preferably, a bundle of optical fibers 52 are utilized. Coupling can be accomplished as set forth in U.S. Pat. No. 5,127,068. Suitable fibers 52 include but are not limited to those that have silica cores with silica cladding.

A telescope arrangement provides for the focussing of the output beam from diode source 43 so that it is incident on laser crystal 44. In one embodiment, the telescope arrangement includes first and second lenses, 54 and 56, that optimize the size of pump beam 46 to avoid fracture of crystal 44, but produce a pump beam such that the ratio of the TEM00 mode diameter to pump beam diameter is less than unity.

In a confocal resonator with no lens, two opposing mirrors are used which have radii of curvature R1 and R2, respectively, and the two mirrors are separated by a distance L, where R1=R2=L. This is, again, a perfect confocal resonator.

Strong thermal lens materials can be used for the laser crystal with the present invention. Suitable strong thermal lens materials include but are not limited to Nd:YAG, Nd:YVO4, Nd:GVO4, Nd:YPO4, Nd:BEL, Nd:YALO and Nd:LSB. A preferred material is Nd:YVO4, available from Litton-Airtron, Charlotte, NC. The atomic percentage of Nd is in the range of 0.5 to 3.0%, preferably about 0.6 to 0.9% and most preferably about 0.8%. Nd:YVO4 is an attractive material for certain applications because, compared to Nd:YLF, it exhibits high gain and a short upper state lifetime. Nd:YAG has an intermediate gain and an intermediate upper state lifetime. Nd:YVO4 is also suitable for diode pumping because its absorption coefficient at the diode pump wavelength of ~809 nm is extremely high, permitting efficient coupling of diode pump beam 46.

Optical, thermal and mechanical characteristics of Nd:YVO4 are different along its "a" and "c" axes. The thermal expansion coefficient in a direction parallel to the "a" axis is about 2.5 times smaller than that parallel to the "c" axis. The variation of the index of refraction, as a function of temperature, is different by about a factor of 2.8 along the "c" and "a" axes. Because Nd:YVO4 is so strongly birefringent, there is more than a 10% difference between the indexes of refraction for the two crystallographic axes.

Nd:YVO4, and other crystals that have strong thermal lens properties, can have a thermal lens of controlled ellipticity, such as circular, by proper control of heat conduction in the crystal, as described in the SPEC 8051 application.

In FIG. 5, a half symmetric resonator 58 includes a laser crystal 60. Resonator mirror 62 and output coupler 64 define a resonator cavity of length L. In FIG. 5, as with all Figures in this disclosure, like reference numerals denote the same elements. The distance between resonator mirror 62 and laser crystal 60 is L1, and the distance between output coupler 64 and laser crystal 60 is L2. Resonator 58 can be made to become almost a perfect confocal resonator when L1<<L2, F=L, and R1, R2>>L. R1 is the radius of curvature of resonator mirror 62, R2 is the radius of curvature of output coupler 64, and F is the focal length of laser crystal 60.

Figure 1A:
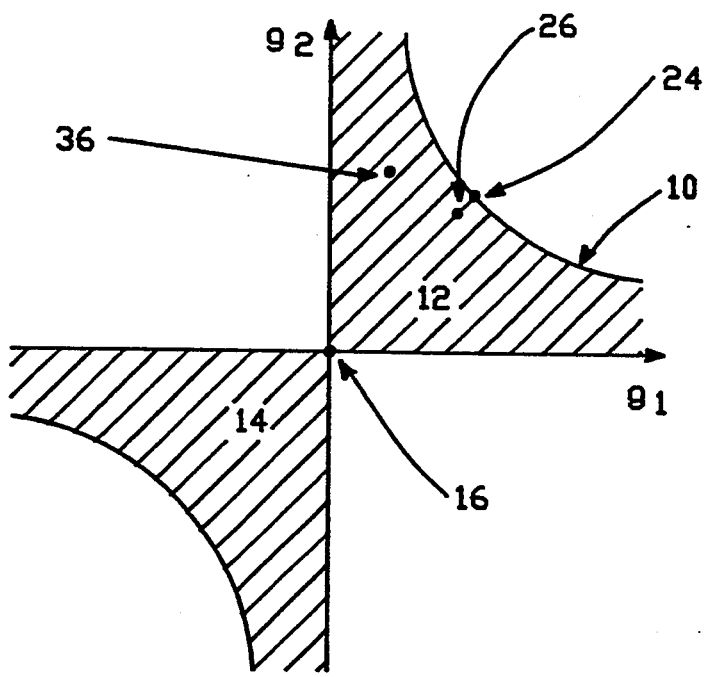
FIG. 1(b) illustrates a schematic diagram of a simple two mirror resonator with mirrors M1 and M2, each having a radius of curvature of R1, R2, respectively, of length L, but the drawing does not include a laser crystal.
FIG. 1(c) illustrates a two mirror resonator with an intracavity lens.

Additionally, a strong thermal lens material, such as Nd:YVO4, can be used as the laser crystal 60 in order that its focussing power modifies the resonator and its stability. In essence, the positions of the g parameters of this laser on the stability diagram of FIG. 1(a) are moved more towards that of a perfect confocal resonator. The effects of a strong thermal lens may be sufficient to create a confocal resonator even with flat mirrors. However, it is preferred if curved mirrors are employed.

FIG. 6 shows a symmetric nearly confocal resonator 66 with a folded geometry. The resonator is defined by an output coupler 68, with a radius of curvature R1, and a resonator mirror 70, with a radius of curvature R2. L1 is the distance between output coupler 68 and laser crystal 72, L2 is the distance between resonator mirror 70 and laser crystal 72. Fold mirror 74 is typically flat, and therefore has a radius of curvature R3 equal to infinity. For a symmetric resonator, L1=L2, and R1=R2. Laser crystal 72 is a strong thermal lens material such as Nd:YVO4, with a thermal lens of controlled ellipticity.

A "two port" resonator 76, shown in FIG. 7, is defined by an output coupler 78, with radius of curvature of R1, a resonator mirror 80, with radius of curvature R2, and two fold mirrors 82 and 84 that define a fold arm of resonator 76. The term "port" refers to a point where diode pump light is input. Two laser crystals 86 and 88 are positioned along a fold arm optical axis 90. Although two crystals are shown, it is possible to use one. Two diode pump sources 44, two sets of optical fibers 52 and two sets of telescope arrangements of lenses 54 and 56 are included. It is possible to use one diode pump source and a bifurcated fiber bundle. Two pump sources are used to increase the output power of resonator 76. In order to minimize damage to the laser crystals, two crystals 86 and 88 are used. Crystals 86 and 88 can be strong thermal lens material and can be made of Nd:YVO4.

Fold mirrors 82 and 84 are dichroic. The optics are HR at the laser wavelength, and HR at the pump wavelength. They can be called "pump windows" Two pump beams, each coming from a diode pump source 44, each provide half of the total pump power. This, again, provides a margin against exceeding the fracture limit of the incident face of the laser crystal. The two pump beams are configured in such a way as to insure their antiparallelism in the laser crystal and their coaxial propagation with respect to the TEMOO mode of resonator 76. This produces a cylindrically symmetric pumped volume, and a radially symmetric composite thermal lens.

Optimal transverse alignment of the two telescope devices that image the pump light into crystals 86 and 88, through lenses 54 and 56, is achieved by insuring that the pump light from diode sources 44, through one fiber 52, or bundle of fibers, is optimally coupled into the other fiber 52, or bundle of fibers, in the absence of laser crystals 86 and 88. Upon insertion of crystals 86 and 88 it is not necessary to further adjust the transverse alignment of the telescopes. A simple optimization of the longitudinal positions of the two telescopes may be necessary after the insertion of crystals 86 and 88. Output coupler 78 and resonator mirror 80 may also be adjusted to ensure the concentricity of the pumped cylindrical volume and the TEMOO mode of resonator 76. An aperture 92 may be included to ensure oscillation in the lowest order mode.

When a strong thermal lens crystal is used, such as Nd:YVO4, the magnitude of the thermal lenses in crystals 86 and 88 is such that resonator 76 cavity is nearly confocal. Resonator 76 is geometrically symmetric about its center, ensuring that the mode size in both crystals 86 and 88 is nearly identical, and that losses due to the aberrated parts of the thermal lenses are minimized. The TEMOO mode sizes in the two highly aberrated pumped volumes are nearly identical. Additionally, the two pumped volumes in crystals 86 and 88 are nearly identical. The close proximity of crystals 86 and 88 allows them to act nearly as a single composite lens and minimizes undesirable dynamic behavior between them and the spatial mode of resonator 76. The close proximity of crystals 86 and 88 to the midpoint of resonator 76 ensures its symmetry.

Figure 1B:
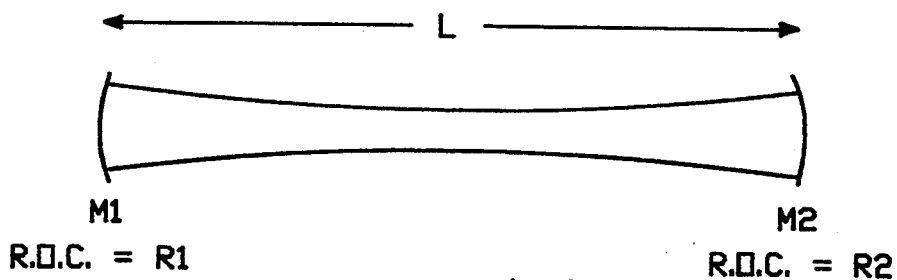
Figure 1C:
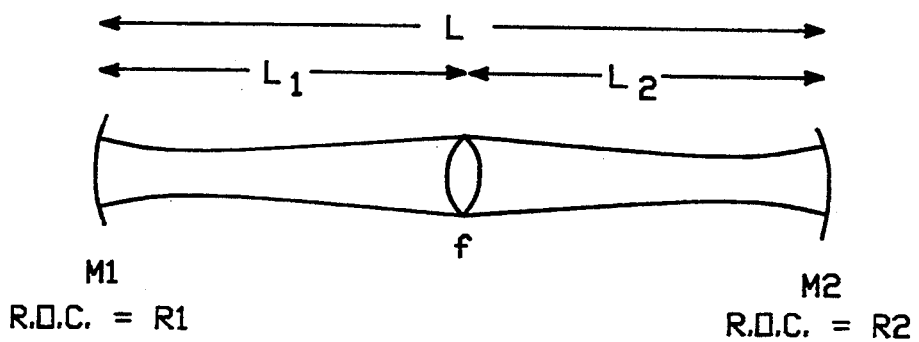
Figure 2:
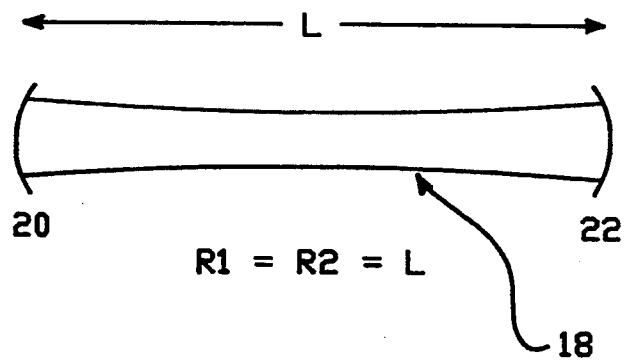
FIG. 2 is a schematic diagram of a simple two mirror confocal resonator. The mirrors each have a radius of curvature R1 and R2 respectively, and are separated by a distance L.

In one embodiment, the resonator has an overall length of approximately 20 cm, and the composite thermal lens crystals 86 and 88 are at the center of the cavity of approximate composite focal length F equal to about 9 cm. A single crystal can also be used. This is achieved for 13 W incident power per port. An aperture 92 is used to ensure TEMOO operation. In this embodiment, dichroic fold mirrors 82 and 84 are flat. Additionally, in this embodiment, output coupler 78 and resonator mirror 80 are flat, or are of long radius curvature. In another embodiment, resonator 76 has a length of about 23 cm, with the same thermal lens power, and includes flat fold mirrors 82 and 84. However, output coupler 78 and resonator mirror 80 are of 60 cm curvature. The resonator of this embodiment is easier to align at low power due to the mirror curvatures, and exhibits excellent pointing stability and insensitivity to misalignment. In both embodiments, the resonators are nearly confocal; the mode size from one end of the resonator to the other varies by not much more than a factor of the square root of 2. With regard to the stability diagram of FIG. 1 (a), both resonators are in the lower half of the diagram, between confocal and concentric, as compared to the upper half, which is between confocal and plane parallel.

The ratio of TEMOO mode diameter in crystals 86 and 88 to pump beam diameter is from 1.2 to as low as 0.6. In one embodiment, it is 0.83.

The ratio of the TEMOO mode diameter in crystals 86 and 88 is less than unity in one embodiment. When a fiber bundle is utilized, the ratio of the TEMOO mode diameter of each crystal 86 and 88, to the diameter of a nearly top hat shaped pump beam, is less than unity to about 0.83. This is in contrast to prior teachings that a ratio of less than unity is inefficient. The TEMOO mode diameter in crystals 86 and 88 is defined traditionally as the diameter at which the mode intensity is $1/e^2$ ($-13.5\%$) of its peak intensity. The pump beam diameter in the crystal is defined as the diameter of the image of the pump beam in the crystal; the intensity distribution of the pump beam is close to a top hat profile.

Although prior investigators have indicated that ratios less than unity should result in lasers that are not efficient, for either strong or weak thermal lens materials, the present invention produces a different result. In one embodiment, the combination of strong thermal lens laser crystals 86, 88, such as Nd:YVO4, management of heat conduction through the "c" crystal faces, and the use of a fiber-coupled diode pump source results in a highly efficient laser that operates in the TEMOO mode over a wide range of pump powers.

FIG. 8 illustrates a schematic of resonator 76 in an unfolded geometry. It is intended to show the respective lengths of components in resonator 76. For a symmetric resonator, L1=L2, F1=F2, R1=R2, and L3 <<L1, L2.

A double "Z" folded confocal resonator 92 is illustrated in FIG. 9. Resonator 92 is defined by an output coupler 94 and a resonator mirror 96. A single laser crystal 98, or two crystals, is positioned along a first fold arm optical axis 100. A single laser crystal 102, or two crystals, is positioned along a second fold arm optical axis 104. An aperture 106 is used. Resonator 92 is symmetric if L1~L2, and L3<<L1, L2.

The 2 port laser of the present invention, in one embodiment, can have the following characteristics: output powers in the range of about 1–12 W; an overall optical efficiency greater than about 25% and preferably greater than 40%; an optical slope efficiency in a TEMOO mode of greater than 40%; a ratio of the TEMOO mode diameter to the pump beam diameter in the crystal in the range of about 1.2 to 0.8, preferably less than 1.0 to 0.83; an M2 of less than 1.2, and preferably less than about 1.05; and a least squares deviation of a beam profile from a gaussian of less than about 10%, and preferably about 1%.

Changes and modifications in the specifically described embodiments can be carried out without departing from the scope of the invention which is intended to be limited only by the scope of the appended claims.

What is claimed is:

1. A high efficiency, diode pumped laser, comprising:
   a resonator mirror and an output coupler defining a nearly confocal resonator with a resonator optical axis;
   a laser crystal positioned in the resonator along the resonator optical axis;
   a diode pump source supplying a pump beam to the laser crystal in the laser resonator producing an output beam; and
   a power source supplying power to the diode pump source;

wherein the output beam has a power greater than about 4 W.

2. The laser of claim 1, wherein the laser has an optical slope efficiency in a TEM00 mode of greater than about 40%.

3. The laser of claim 1, wherein the laser has an optical efficiency of greater than about 25%.

4. The laser of claim 1, wherein a ratio of a TEM00 mode diameter of the laser crystal to a pump beam diameter in the crystal is about less than 1.0 to 0.83.

5. The laser of claim 1, wherein the output beam is a diffraction limited gaussian beam.

6. A high efficiency, diode pumped laser, comprising:
a resonator mirror and an output coupler defining a non-confocal resonator with a resonator optical axis;
a strong thermal lens laser crystal, the thermal lens having a controlled ellipticity, positioned in the resonator along the resonator optical axis transforming the non-confocal resonator to a nearly confocal resonator;
a diode pump source supplying a pump beam to the laser crystal in the laser resonator to produce an output beam; and
a power source supplying power to the diode pump source.

7. The laser of claim 6, wherein the laser has an optical slope efficiency in a TEM00 mode of greater than about 40%.

8. The laser of claim 6, wherein the laser has an optical efficiency of greater than about 25%.

9. The laser of claim 6, wherein a ratio of a TEM00 mode diameter of the laser crystal to a pump beam diameter in the crystal is about less than 1.0 to 0.83.

10. The laser of claim 6, wherein the output beam is a diffraction limited gaussian beam.

11. The laser of claim 6, wherein the output beam has a power greater than about 4 W.

12. A nearly diffraction limited, high efficiency, diode pumped laser, comprising:
a resonator mirror and an output coupler defining a nearly confocal resonator with a resonator optical axis;
a strong thermal lens laser crystal, the thermal lens having controlled ellipticity, with a TEM00 mode diameter, positioned in the resonator along the resonator optical axis;
a diode pump source supplying a pump beam to the laser crystal in the laser resonator to produce an output beam, and create a pump beam diameter in the laser crystal greater than the TEM00 mode diameter; and
a power source supplying power to the diode pump source.

13. The laser of claim 12, wherein the laser has an optical slope efficiency in a TEM00 mode of greater than about 40%.

14. The laser of claim 12, wherein the laser has an optical efficiency of greater than about 25%.

15. The laser of claim 12, wherein a ratio of the TEM00 mode diameter of the laser crystal to the pump beam diameter in the crystal is about less than 1.0 to 0.83

16. The laser of claim 12, wherein the output beam is a diffraction limited gaussian beam.

17. The laser of claim 12, wherein the laser crystal is Nd:YVO4.

18. A multi port, high efficiency, diode pumped laser, comprising:
a resonator mirror and an output coupler defining a nearly confocal resonator, the resonator including first and second pump windows defining a first fold arm of the of the resonator, the first fold arm defining a first fold arm optical axis;
a first laser crystal positioned in the resonator along the first fold arm optical axis;
a first diode pump source, positioned adjacent to the first pump window, supplying a first pump beam to the laser crystal in the laser resonator producing an output beam;
a second diode pump source, positioned adjacent to the second pump window, supplying a second pump beam to the laser crystal in the laser resonator producing the output beam; and
at least one power source supplying power to the first and second pump sources.

19. The laser of claim 18, wherein the laser has an optical slope efficiency in a TEM00 mode of greater than about 40%.

20. The laser of claim 19, wherein the laser has an optical efficiency of greater than about 25%.

21. The laser of claim 20, wherein a ratio of a TEM00 mode diameter of the laser crystal to a pump beam diameter in the crystal is about less than 1.0 to 0.83.

22. The laser of claim 20, wherein the output beam is a diffraction limited gaussian beam.

23. The laser of claim 20, wherein the output beam has a power greater than about 4 W.

24. The laser of claim 20, wherein the laser crystal is made of a strong thermal lens material, with a thermal lens of controlled ellipticity.

25. The laser of claim 20, wherein the laser crystal is Nd:YVO4.

26. The laser of claim 20, further comprising, a second laser crystal positioned adjacent to the first laser crystal along the first fold arm optical axis, between the first laser crystal and the second pump window.

27. A multi port, high efficiency, diode pumped laser, comprising:
a resonator mirror and an output coupler defining a nearly confocal resonator, the resonator including first and second pump windows defining a first fold arm of the resonator, third and fourth pump windows defining a second fold arm of the resonator, the first fold arm defining a first fold arm optical axis, and the second fold arm defining a second fold arm optical axis;
a first laser crystal positioned in the resonator along the first fold arm optical axis;
a second laser crystal positioned in the resonator along the second fold arm optical axis;
a first diode pump source, positioned adjacent to the first pump window, supplying a first pump beam to the first crystal to produce an output beam;
a second diode pump source, positioned adjacent to the second pump window, supplying a second pump beam to the first crystal to produce the output beam;
a third diode pump source, positioned adjacent to the third pump window, supplying a third pump beam to the second crystal to produce the output beam;
a fourth diode pump source, positioned adjacent to the fourth pump window, supplying a fourth pump beam to the second crystal to produce the output beam; and at least one power source supplying power to the first, second, third and fourth diode pump sources.

28. The laser of claim 27, wherein the laser has an optical slope efficiency in a TEM00 mode of greater than about 40%.

29. The laser of claim 27, wherein the laser has an optical efficiency of greater than about 25%.

30. The laser of claim 27, wherein a ratio of a TEM00 mode diameter of each laser crystal to a corresponding pump beam diameter in the crystal is about less than 1.0 to 0.83.

31. The laser of claim 27, wherein the output beam is a diffraction limited gaussian beam.

32. The laser of claim 27, wherein the output beam has a power greater than about 4 W.

33. The laser of claim 27, wherein the laser crystal is made of a strong thermal lens material, with a thermal lens of controlled ellipticity.

34. The laser of claim 27, wherein the laser crystal is Nd:YVO4.

35. The diode pumped laser of claim 27, further comprising, a third laser crystal positioned adjacent to the first laser crystal along the first fold arm optical axis, between the first laser crystal and the second pump window; and a fourth laser crystal positioned adjacent to the second laser crystal along the second fold arm optical axis, between the second laser crystal and the fourth pump window.

* * * * *